United States Patent
Ganzel et al.

(10) Patent No.: US 6,634,723 B1
(45) Date of Patent: Oct. 21, 2003

(54) ELECTRO-HYDRAULIC CONTROL UNIT FOR AN ELECTRONIC BRAKE CONTROL SYSTEM

(75) Inventors: Blaise J. Ganzel, Ann Arbor, MI (US); Patrick H. Hool, St. Clair, MI (US); Dion Parker, Livonia, MI (US); Mark Haller, Canton, MI (US); Keith Johnson, Westland, MI (US); Humphry Ormesher, Witney Oxfordshire (GB)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/070,145
(22) PCT Filed: Sep. 7, 2000
(86) PCT No.: PCT/US00/24496
§ 371 (c)(1), (2), (4) Date: Mar. 1, 2002
(87) PCT Pub. No.: WO01/17832
PCT Pub. Date: Mar. 15, 2001

Related U.S. Application Data
(60) Provisional application No. 60/153,430, filed on Sep. 10, 1999.

(51) Int. Cl.[7] .................................................. B60T 8/36
(52) U.S. Cl. ............................. 303/119.3; 303/DIG. 10
(58) Field of Search ................................ 303/119.2, 20, 303/119.3, DIG. 10

(56) References Cited

U.S. PATENT DOCUMENTS

| | | | |
|---|---|---|---|
| 5,040,853 A | * | 8/1991 | Burgdorf et al. ......... 303/119.3 |
| 5,362,141 A | * | 11/1994 | Beck et al. .............. 303/119.3 |
| 5,466,055 A | | 11/1995 | Schmitt et al. |
| 5,513,905 A | * | 5/1996 | Zeides et al. ............ 303/119.3 |
| 5,853,231 A | * | 12/1998 | Iwamura et al. ......... 303/119.2 |
| 5,957,547 A | | 9/1999 | Schliebe et al. |
| 6,059,382 A | * | 5/2000 | Schoettl .................... 303/119.3 |
| 6,079,798 A | | 6/2000 | Hosoya |
| 6,120,114 A | * | 9/2000 | Blazic et al. ............. 303/119.2 |
| 6,224,169 B1 | * | 5/2001 | Aoki et al. ............... 303/116.4 |
| 6,293,634 B1 | * | 9/2001 | Hosoya .................... 303/119.2 |
| 6,354,674 B1 | * | 3/2002 | Iwamoto et al. ......... 303/119.3 |
| 6,412,754 B1 | * | 7/2002 | Ogino et al. ........... 251/129.15 |

FOREIGN PATENT DOCUMENTS

| | | |
|---|---|---|
| DE | 19712211 | 10/1998 |
| DE | 19802043 | 5/1999 |
| EP | 0499670 | 8/1992 |
| WO | 94/03352 | 2/1994 |

* cited by examiner

Primary Examiner—Christopher P. Schwartz
Assistant Examiner—Devon Kramer
(74) Attorney, Agent, or Firm—MacMillan, Sobanski & Todd, LLC

(57) ABSTRACT

An electro-hydraulic control unit includes a valve body having a recess formed in a surface thereof and a circumferential wall which extends around the recess. The wall includes at least one widened portion. An electronic control Unit is mounted over the recess. The electronic control unit carries a circuit substrate which extends over the widened portion of the valve body wall such that widened portion of the valve body wall forms a heat for an electronic component carried by the circuit substrate. Additionally, components mounted on upon the circuit substrate, including a motor connector extending into the recess. A pump motor is mounted upon the valve body surface opposite from the electronic control unit. An electrical connector extends from the motor through a bore formed in the valve body and connects to the motor connector mounted upon the circuit substrate.

12 Claims, 3 Drawing Sheets

ELECTRO-HYDRAULIC CONTROL UNIT FOR AN ELECTRONIC BRAKE CONTROL SYSTEM

CROSS REFERENCE TO RELATED APPLICATIONS

This application claims the benefit of U.S. Provisional Application No. 60/153,430, filed Sep. 10, 1999 and International Application No. PCT/US00/24496 filed on Sep. 7, 2000.

BACKGROUND OF THE INVENTION

This invention relates in general to electronic brake control systems and in particular to an electro-hydraulic control unit for an electronic brake control system.

An Electronic Brake Control System (EBCS) is often included as standard equipment on new vehicles. When actuated, the EBCS is operative to modulate the pressure applied to the vehicle wheel brakes. A typical EBCS includes a plurality of solenoid valves mounted within a control valve body and connected to the vehicle hydraulic brake system between the brake master cylinder and the individual wheel brake cylinders. The solenoid valves usually are normally open, or isolation, valves and normally closed, or dump, valves. Proportional solenoid valves also can be included. The valve body further includes one or more accumulators for the temporary storage of brake fluid during an operating cycle of the EBCS.

A separate hydraulic source, such as a motor driven pump, is usually included in the EBCS. The pump supplies pressurized brake fluid for reapplying the controlled wheel brakes during an EBCS operational cycle. The pump is typically included within the control valve body while the pump motor is mounted upon the exterior of the control valve body. The pump motor is usually a direct current motor which operates from the vehicle power supply. Typically, the motor runs continuously during an EBCS braking cycle.

An EBCS further includes an electronic control module which has a microprocessor. The microprocessor is electrically connected to the pump motor, a plurality of solenoid coils associated with the solenoid valves, and wheel speed sensors for monitoring the speed and deceleration of the vehicle wheels. The microprocessor also is typically electrically connected to the brake light switch and receives a signal from the switch when the vehicle brakes are applied. Additionally, the EBCS may include one or more accelerometers which also are connected to the microprocessor. The microprocessor includes a memory portion which stores control algorithms for each mode of operation of the EBCS. The control algorithms comprise a set of instructions for the microprocessor which control the operation of the EBCS. The control module is usually mounted upon the valve body. The assembled valve body, motor and control module form a compact unit which is often referred to as an electro-hydraulic control unit.

During vehicle operation, the microprocessor in the EBCS control module continuously receives speed signals from the wheel speed sensors. Depending upon the received signals, the microprocessor can select one of several modes for operation of the EBCS. For example, if the microprocessor detects a potential wheel lock-up condition while the vehicle brakes are applied, the microprocessor will select an Anti-Lock Brake System (ABS) mode of operation and activate an ABS braking cycle. During an ABS braking cycle, the microprocessor actuates the pump motor and selectively operates the solenoid valves in the control valve to cyclically relieve and reapply hydraulic pressure to the wheel brakes. The hydraulic pressure applied to the wheel brakes is adjusted by the operation of the solenoid valves to limit wheel slippage to a safe level while continuing to produce adequate brake torque to decelerate the vehicle as desired by the vehicle operator.

Another mode of operation provides Traction Control (TC). If the microprocessors detect excessive slip of a driven wheel when the wheel brakes are not applied, the EBCS will apply the brakes to the slipping wheel and thereby transfer more engine torque to the non-slipping wheel.

The EBCS can also include Vehicle Stability Control (VSC) mode of operation. The VSC mode is entered when the microprocessor detects a potential loss of directional control, such as, for example, a spin-out of the vehicle. In the VSC mode of operation, selected wheel brakes are applied to restore directional control of the vehicle.

SUMMARY OF THE INVENTION

This invention relates to an electro-hydraulic control unit for an electronic brake control system.

In the past electronic brake control systems have had rather bulky and heavy electro-hydraulic control units. Accordingly, the size can restrict the placement of the control unit within the vehicle while the weight adds to the total vehicle weight. Accordingly, it would be desirable to reduce the size and weight of the electro-hydraulic control unit.

The present invention contemplates an electro-hydraulic control unit for a hydraulic system that includes a valve body having a recess formed in a surface thereof. The recess is surrounded by a circumferential wall. A housing is removablely attached to the valve body wall and covers the recess. A circuit substrate is carried by the housing and extends over a portion of the valve body circumferential wall. At least one circuit component is mounted upon the circuit substrate and extends into the valve body recess.

The invention further contemplates that at least one solenoid valve is mounted upon the valve block and extends into the recess and that the circuit component mounted upon the substrate is a solenoid coil associated with the solenoid valve. Additionally, the circumferential wall includes at least one widened portion which is adjacent to the circuit substrate. The widened portion of the circumferential wall functions as a heat sink for an electronic component mounted upon the circuit substrate. To enhance the transfer of heat from the electronic component to the valve body wall, at least one via is formed through the circuit substrate between the electronic component and the widened portion of the circumferential wall. Additionally, a pad of heat conductive material can be disposed between the circuit substrate and the widened portion of the circumferential wall to further enhance the transfer of heat.

The invention also contemplates a pump motor mounted upon a surface of the valve body opposite from the surface that carries the housing. The motor has an electrical connector extending through a bore formed through the valve body and having an end which is received by an electrical motor connector mounted upon the circuit substrate. The motor connector mounted upon the circuit substrate extends into the recess formed in the valve body. In the preferred embodiment, the motor connector includes at least one electrical conductor overmolded with a body portion.

The control unit can be included in a vehicle brake system and utilized to provide anti-lock brake capability, traction control and/or vehicle stability control for the vehicle.

DETAILED DESCRIPTION OF THE PREFERRED EMBODIMENT

Figure 1:
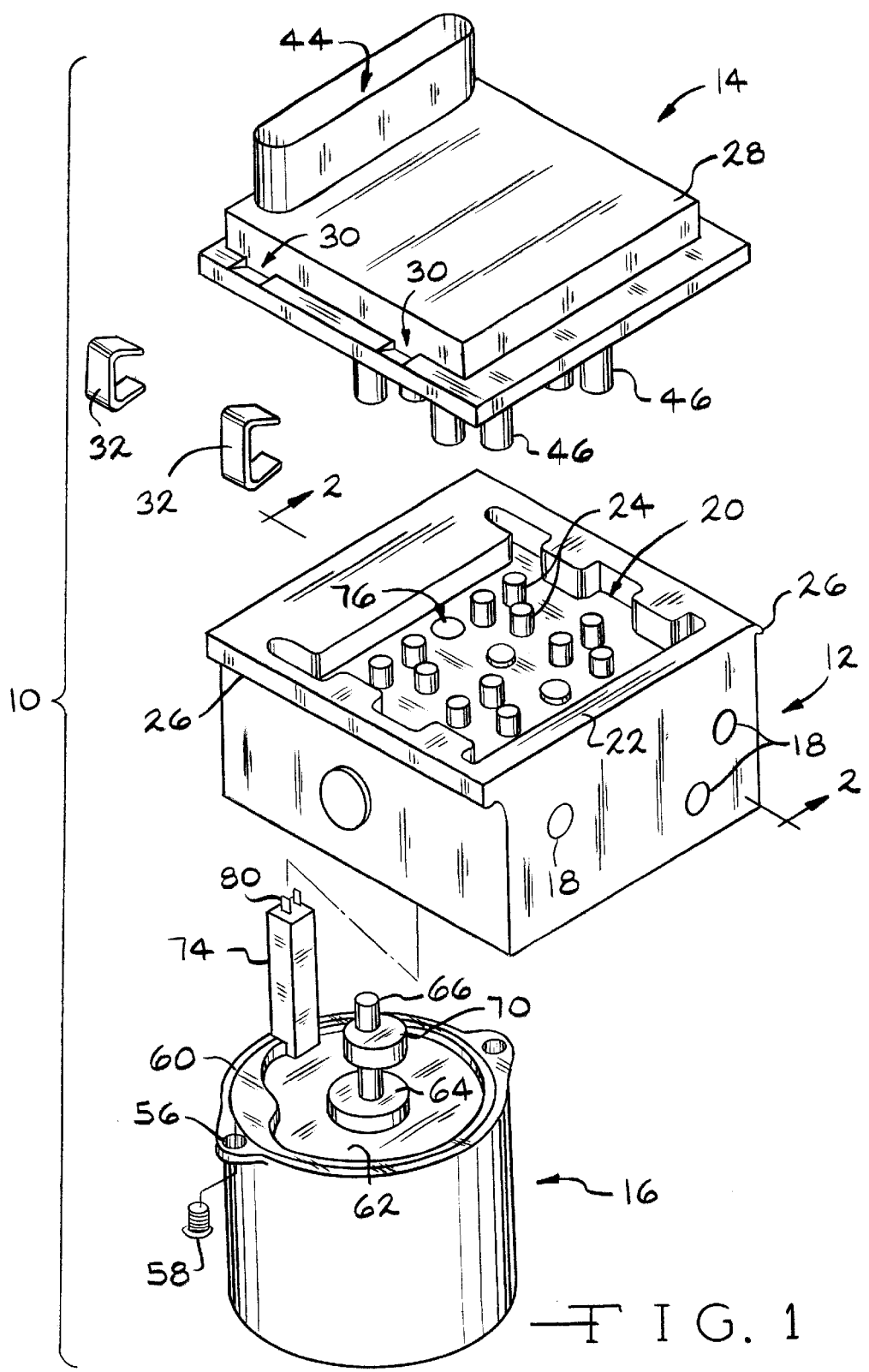
FIG. 1 is an exploded view of an electro-hydraulic control unit in accordnace with the invention.

Referring now to the drawings, there is illustrated in FIG. 1 an exploded view of an Electro-Hydraulic Control Unit (EHCU) 10 in accordance with the invention. The unit 10 is a "pancake" design with a control valve body 12 disposed between an Electronic Control Unit (ECU) 14 and a pump motor 16.

Figure 2:
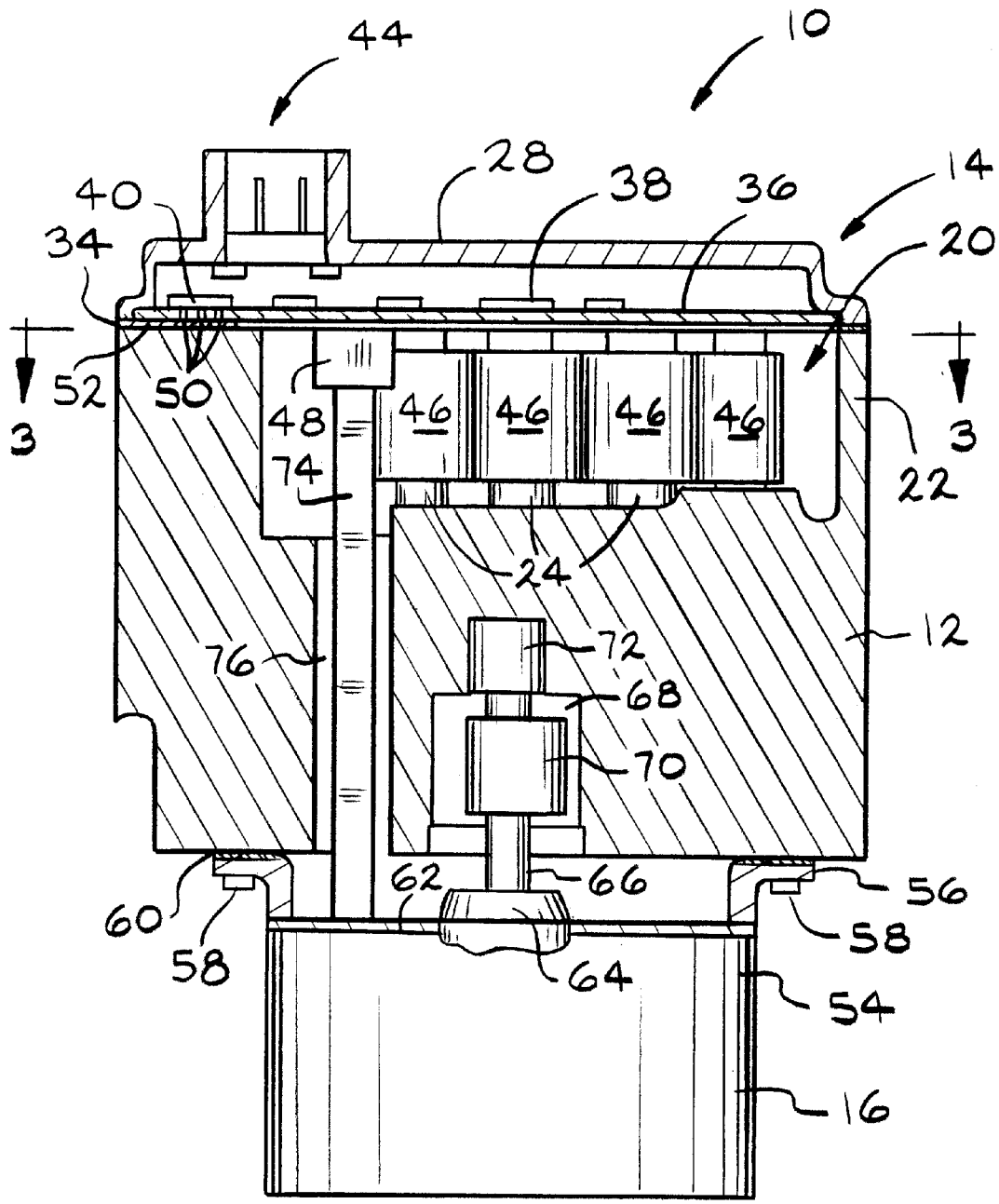
FIG. 2 is a sectional view of the electro-hydraulic control unit shown in FIG. 1 taken along line 2—2.
Figure 3:
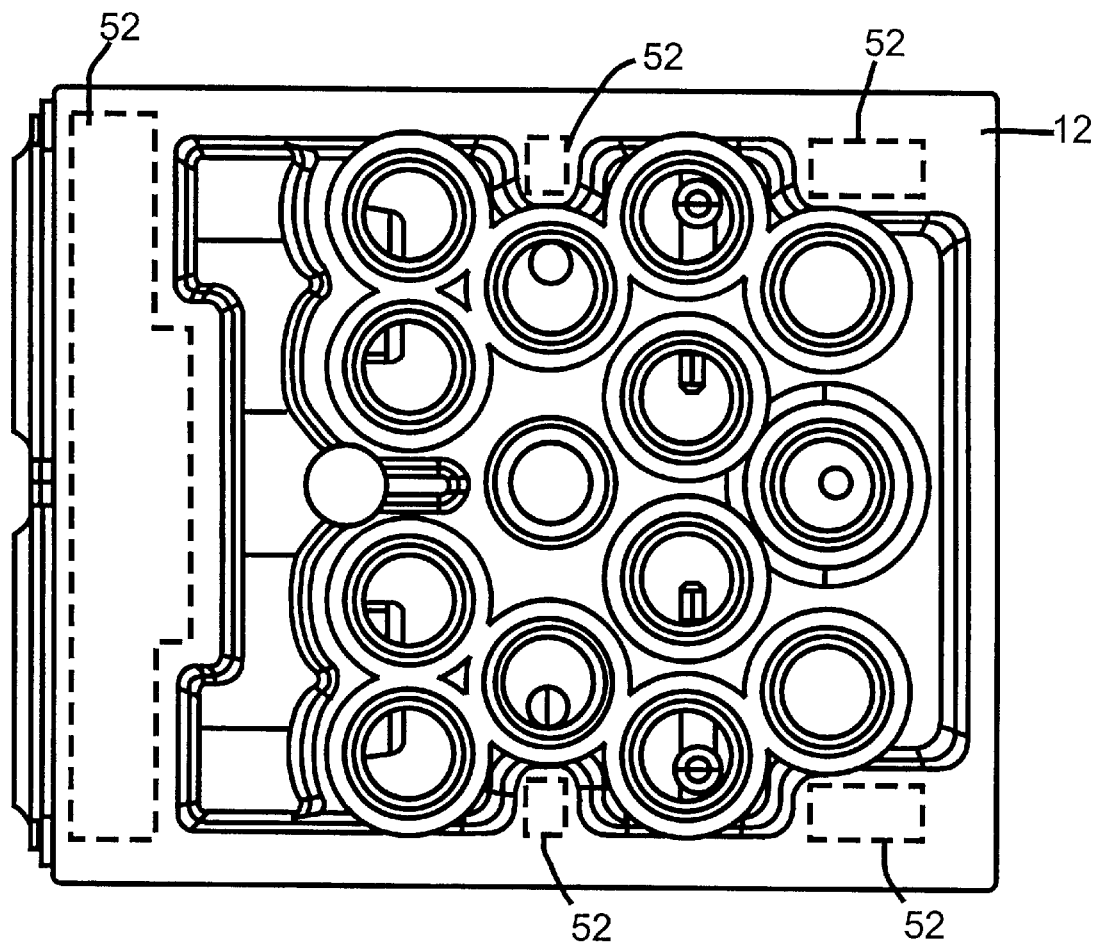
FIG. 3 is a plan view of the valve body shown in FIG. 1 taken along line 3—3 in FIG. 2.

In the preferred embodiment, the control valve body 12 is formed as a near net forging and machined to a finished shape. A plurality of ports 18 formed in the valve body are connected to the hydraulic lines of the vehicle brake system. The ports communicate with internal passageways (not shown) formed within the valve body 12. As best seen in FIG. 2, a portion of the upper surface of the control valve body 12 is formed as a recess 20 surrounded by a circumferential wall 22. As shown in FIG. 3, portions of the wall 22 have a greater thickness, or width. The reason for forming wider portions of the wall 22 will be explained below. A plurality of solenoid valves 24 are mounted in bores formed in the bottom surface of the recess 20 and extend in an upward direction into the recess 20. The solenoid valves 24 communicate with the internal passageways formed in the valve body 12 and are selectively actuated to control the flow of brake fluid in the vehicle brake system. A pair of lips 26 are formed along the edges of the valve body 12. The purpose for the lips 26 will be explained below.

The ECU 14 includes a housing 28 which, in the preferred embodiment is formed from plastic. Recesses 30 formed in the edge of the ECU housing 28 receive the ends of a plurality of clips 32. The clips 32 cooperate with the valve body lips 26 and corresponding recesses 30 formed in the edges of the ECU housing 28 to secure the ECU 14 to the valve body 12. A seal 34 formed from a resilient material is disposed between the lower edge of the housing 28 and the upper surface of the valve body wall 22.

The ECU housing 28 carries a circuit substrate 36, such as a Printed Circuit Board (PCB). A plurality of electronic components, including a microprocessor 38 for controlling the EBCS and high power capacity electronic switches 40 for controlling the solenoid valves 24 and motor 16, are mounted upon the upper surface of the circuit substrate 36. Electrically conductive traces (not shown), which are deposited upon the substrate, connect the electronic components. The housing 28 also carries a conventional external connector 44 for electrically connecting the ECU 14 to external components of the EBCS, such as wheel speed sensors (not shown), and the vehicle power supply (not shown). The external connector 44 is electrically connected to the traces deposited upon the substrate 36. Additionally, solenoid coils 46 associated with corresponding solenoid valves 24 are mounted upon the lower surface of the circuit substrate 36.

The coils 46 extend into the recess 20 and have coil leads that extend upwardly and are electrically connected to the conductive traces formed upon the substrate. Also, an electrical motor connector 48 is mounted upon the lower surface of the substrate 36 and extends into the recess 20 formed in the valve body 12. The electrical motor connector 48 is electrically connected to the substrate conductive traces.

The electronic switches 40, which in the preferred embodiment are power Field Effect Transistors (FET's) typically generate heat when they are operated. Accordingly, the electronic switches 40 are mounted over the wider portions of the valve body wall 22. A plurality of metal lined vias 50 are formed through the circuit substrate 36 beneath the electronic switches 40 to conduct the heat away from the electronic switches 40 and into the valve body 12. Thus, the mass of the valve body 12 functions as a heat sink for the electronic switches 40.

To further enhance the heat transfer, in the preferred embodiment a pad of resilient thermally conductive and electrically insulative material 52 is disposed between the lower surface of the substrate 36 and the top surface of widened portion of the valve body wall 22. The resiliency of the pad 52 assures that good surface contact is provided between the lower surface of the substrate 36 and the top surface of the wall 22. A typical material that could be used for the pad 52 may include a filled thermally conductive polymer such as GAP PAD™ VO Ultrasoft or soft as commercially available from the Bergquist Company. The present invention contemplates that a plurality of pads 52 are positioned upon the lower surface of the substrate 36 over the widened portions of the wall 22. The positions of the pads 52 are shown by the dashed outlines in FIG. 3. While the thermal pads 52 have been described as being mounted adjacent to FET's, it will be appreciated that they also can be used to enhance the removal of heat from other electronic components. Additionally, the invention contemplates that other commercially available thermally conductive materials can be used in place of the thermal pads 52. In the prior art, a separate metal cover (not shown) for the ECU 14 has been utilized as a heat sink. The present invention eliminates the need for a separate cover, reducing the overall size, weight and cost of the control unit 10. Additionally, the elimination of a separate cover also eliminates a seal between the cover and the ECU hosing which not only reduces cost but also improves the reliability of the ECU 14.

As shown in FIGS. 1 and 2, the pump motor 16 is mounted upon the lower surface of the valve body 12. The motor 16 includes a housing 54 having an end flange 56. A plurality of fastners 58 secure the motor flange 56 to the valve body 12. A resilient material 60 disposed between the end of the motor 16 and the lower surface of the valve body 12 forms a seal therebetween. A recessed bearing plate 62 mounted in the open end of the motor housing 54 carries an outer motor bearing 64. As best seen in FIG. 2, a motor shaft 66 extends through the outer motor bearing 64 and into a stepped bore 68 formed in the lower portion of the valve body 12. The motor shaft 66 carries an eccentric cam 70. The cam 70 drives with a pair of reciprocating pumps (not shown) mounted within the valve body 12 to supply pressurized brake fluid to the EBCS. An end bearing 72 disposed in the upper end of the bore 68 receives and supports the end of the motor shaft 66.

An electrical connector 74 extends upwardly from the motor 16 and through a bore 76 formed through the valve body 12. The connector 74 can be a co-axial or pin connector. In the preferred embodiment, a pair of conductors (not shown) are overmolded within the body of connector 74 and terminate in a pair of blade connectors 80 which extend from the top end of the connector, as illustrated in FIG. 1. The blade connectors 80 are received in a corresponding female receptacle 48 mounted upon the lower substrate of the circuit substrate 36. In the preferred embodiment, the connector 74 is formed integrally with the end bearing plate 62. The connector bore 76 is sized with a larger diameter than the conductor 74 and the blade connectors 80 and receptacle 48 are sized to accommodate manufacturing tolerance stack up to assure a connection between the ECU 14 and the motor 16 when the EHCU 10 is assembled. Alternately, the connector 74 may terminate is a female connector which cooperates with a male connector mounted upon the circuit substrate 36 (not shown). Furthermore, the motor housing and valve block can form an electrical return path, in which case only one conductor will be carried by the connector 14. Similarly, the connector 14 also may carry more that two conductors. Additionally, a coaxial connector (not shown) having one or more conductors may be utilized.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the preferred embodiment was illustrated and described for an EBCS that provided operating modes for ABS, TC and VSC for a vehicle; however, it will be appreciated that the invention also can be practiced for a system including any one or combination of any two of these modes of operation.

What is claimed is:

1. An electro-hydraulic control unit for a hydraulic system comprising:
   a valve body having a recess formed in a surface thereof, said recess surrounded by a circumferential wall;
   at least one solenoid valve mounted upon said valve body, said solenoid valve having a portion that extends into said recess;
   a housing removablely attached to said valve body wall, said housing covering said recess; and
   a circuit substrate carried by said housing and extending over a portion of said valve body circumferential wall; and
   at least one solenoid coil associated with said solenoid valve, said solenoid coil mounted upon said substrate and extending into said valve body recess.

2. The control unit according to claim 1 wherein said circumferential wall includes at least one widened portion which is adjacent to said circuit substrate whereby said widened portion of said circumferential wall functions as a heat sink for an electronic component mounted upon said circuit substrate.

3. The control unit according to claim 2 wherein at least one via is formed through said circuit substrate between said electronic component and said widened portion of said wall whereby said transfer of heat is enhanced.

4. The control unit according to claim 3 further including a pad of heat conductive material disposed between a portion of said circuit substrate and said widened portion of said wall whereby said transfer of heat is further enhanced.

5. The control unit according to claim 4 further including a pump motor mounted upon a surface of said valve body opposite from said surface which carries said housing, said motor having a rigid electrical connector extending through a bore formed through said valve body, said electrical connector having an end which is received by an electrical motor connector mounted upon said circuit substrate, said motor connector mounted upon said circuit substrate and extending into said recess formed in said valve body.

6. The control unit according to claim 5 wherein said motor includes a recessed bearing plate, said recessed bearing plate carrying an outer motor bearing assembly.

7. The control unit according to claim 6 wherein said motor connector is formed integrally with said motor recessed bearing plate.

8. The control unit according to claim 7 wherein said motor connector includes at least one electrical conductor overmolded with a body portion.

9. The control unit according to claim 5 wherein the hydraulic system is a vehicle brake system and the control unit is an electo-hydraulic control unit.

10. The control unit according to claim 9 further including a microprocessor mounted upon said circuit substrate, said microprocessor operable to control hydraulic pressure applied to vehicle brakes to prevent vehicle brake lock-up.

11. The control unit according to claim 9 further including a microprocessor mounted upon said circuit substrate, said microprocessor operable to control hydraulic pressure applied to the vehicle brakes to prevent excessive slip of driven vehicle wheels upon application of torque.

12. The control unit according to claim 9 further including a microprocessor mounted upon said circuit substrate, said microprocessor operable to control hydraulic pressure applied to the vehicle brakes to enhance vehicle directional control.

\* \* \* \* \*